W. A. SCHMIDT.
PROCESS OF EXTRACTING METALS FROM THEIR ORES.
APPLICATION FILED FEB. 18, 1916.
1,237,220.
Patented Aug. 14, 1917.
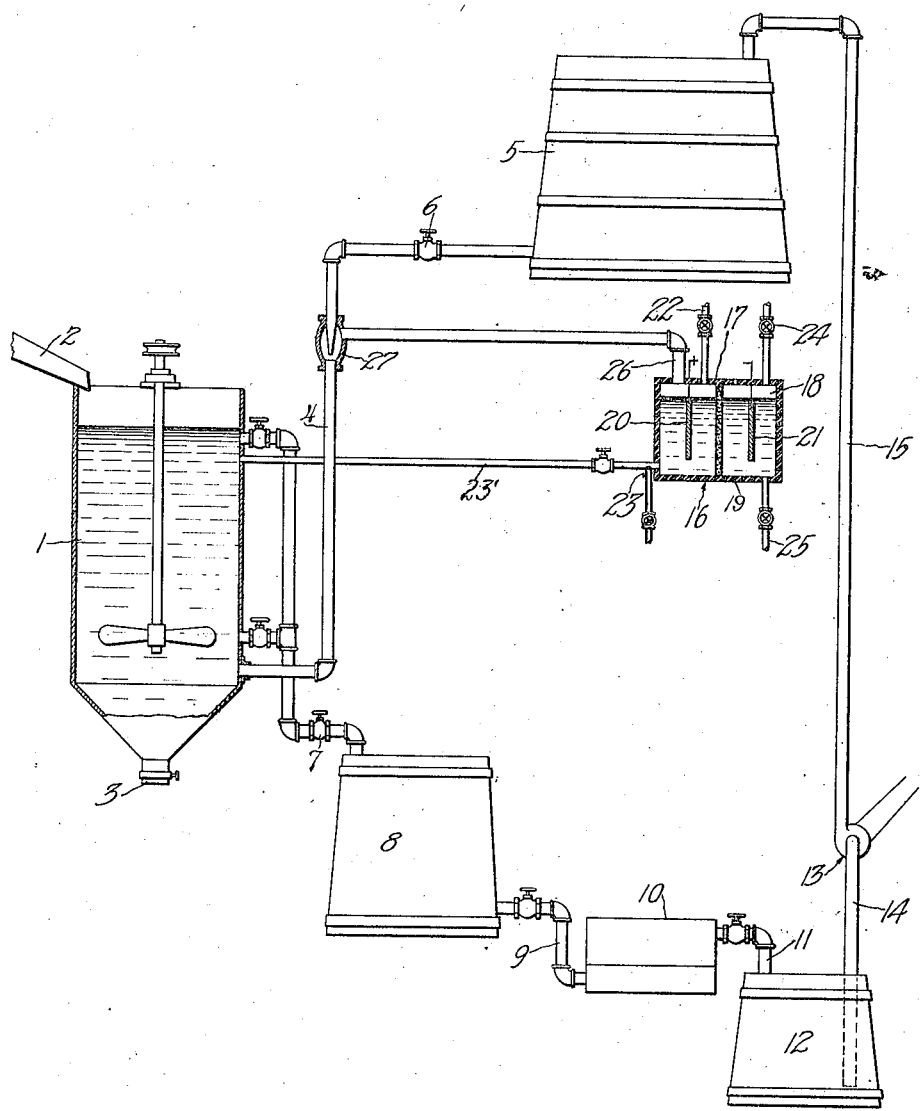
Inventor
Walter August Schmidt
by
Arthur P. Knight
his Attorney.

UNITED STATES PATENT OFFICE.

WALTER AUGUST SCHMIDT, OF LOS ANGELES, CALIFORNIA, ASSIGNOR TO WESTERN PRECIPITATION COMPANY, OF LOS ANGELES, CALIFORNIA, A CORPORATION OF CALIFORNIA.

PROCESS OF EXTRACTING METALS FROM THEIR ORES.

1,237,220.

Specification of Letters Patent.

Patented Aug. 14, 1917.

Application filed February 18, 1916. Serial No. 79,099.

*To all whom it may concern:*

Be it known that I, WALTER AUGUST SCHMIDT, a citizen of the United States, residing at Los Angeles, in the county of Los Angeles and State of California, have invented a new and useful Process of Extracting Metals from Their Ores, of which the following is a specification.

This invention relates to extraction of copper or other metals from their ores by means of a leaching solution containing chlorin as the active agent. In processes of this kind it is usual to employ ferric chlorid as the leaching agent, together with sufficient alkali metal chlorid to retain in solution the cuprous chlorid resulting from the leaching operation. The copper is generally precipitated from the solution, and the solution then regenerated by electrolysis.

An important object of my invention is to provide for regeneration of the solution in a more economical and effective manner than is practicable with the usual method of direct electrolysis of the solution. In order to avoid undue loss of sodium in the tailings, it is desirable that the percentage of sodium chlorid in the solution should not exceed that which is necessary for retention of the cuprous chlorid in solution; but electrolysis of a solution having such a low salt concentration is wasteful electrically on account of the high resistance thereof. Moreover, the admission of the lixiviate to the electrolytic cells leads to serious difficulties, on account of the cells becoming clogged and fouled, and also requires an unduly large electrolytic plant.

My invention provides for carrying on both the leaching and the electrolytic regenerating operations under conditions most favorable for economy and efficiency. This object I attain by electrolyzing, in a cell separate from the apparatus through which the leach passes, a solution of sodium chlorid of sufficient concentration to give the low resistance required for efficient electrolysis, passing the chlorin produced in such cell into the leaching liquid in such manner as to effectively regenerate the same, and maintaining in the leaching liquid, a comparatively low concentration of sodium chlorid, so as to minimize the loss of sodium chlorid in the tailings and wash water.

Another important object of the present invention is to maintain the iron balance in the leaching solution, so as to prevent depletion of iron in the solution by reason of undue precipitation of iron in the leaching operation, for example, by the action of base metal compounds in the ore. In the cyclic operation, the amount of iron taken up in the precipitation of the copper is equivalent to the amount of copper dissolved in the leaching operation, and when ferric chlorid alone is used as the active agent of the leach, the precipitation of iron by reaction with the base metal compound in the ore may be greater than the amount of iron taken up by the copper-precipitation. This difficulty is avoided by providing for a certain amount of free chlorin in the solution, which takes up copper in sufficient amount to insure replenishing of the iron in the solution in the subsequent precipitation of the copper by means of iron.

In applying a process of the type above referred to, to copper ore containing a base metal compound, such as calcium carbonate or magnesium carbonate, there is more or less precipitation of iron in the leaching operation, as carbonate or hydrate, and another object of the present invention is to provide for re-solution of some or all of this iron, by the action of free chlorin introduced into the leaching solution. Such free chlorin, reacting with ferric hydrate or carbonate, produces ferric chlorid, together with hypochlorous acid, so that this reaction not only restores iron to the solution but enables the chlorin to be taken up in the form of hypochlorous acid which is a very active solvent for copper, and under certain conditions, for example in treatment of sulfid ores, much more effective than ferric chlorid.

My process consists essentially in electrolyzing a relatively strong solution of sodium chlorid or equivalent chlorid, to produce free chlorin, introducing this free chlorin into the spent leach after the copper has been precipitated therefrom, so as to restore the iron or equivalent metal therein to ferric or equivalent condition, and maintaining in the leaching solution a strength of sodium chlorid which is less than that of the electrolyzed solution but is sufficient for retaining in solution the cuprous chlorid formed in leaching.

The accompanying drawing is a diagrammatic side elevation of an apparatus suitable for carrying out my invention.

In said drawing, 1 designates an agitator or leaching tank, provided with suitable means, indicated respectively at 2 and 3, for supplying ore thereto, and for withdrawing the sludge therefrom. The leaching solution may be supplied to said tank 1 from a storage tank 5, through a valve 6 and a pipe 4 leading from said valve to the lower part of tank 1. A valved discharge pipe 7 leads from tank 1 to a storage tank 8, from which a valved pipe 9 leads to the precipitator 10. Said precipitator discharges by a pipe 11 to a sump 12, from which the spent leach is pumped back by pump 13, through pipes 14 and 15 to the tank 5.

16 designates a two-compartment electrolytic cell, having compartments 17 and 18, separated by a permeable diaphragm 19, and containing respectively the anode 20 and cathode 21. The anode compartment is provided with inlet and outlet means 22 and 23, and the cathode compartment with inlet and outlet means 24 and 25, whereby the flow of solution through these compartments may be regulated. The anode compartment is inclosed or covered so as to retain the chlorin set free by electrolysis, and a pipe 26 leads from said compartment to a suitable point for supply of the chlorin to the leaching solution. For this purpose I prefer to connect the pipe 26 to an aspirator or injector 27 interposed in the supply pipe 4 for the leaching tank 1, so that the flow of liquid through pipe 4 will produce a partial vacuum or condition of suction in pipe 26 and in the anode compartment 17, whereby leakage of chlorin is prevented, and the chlorin is drawn into the solution as fast as it is liberated by electrolysis. The pipe 4 is preferably of considerable length between the aspirator or injector 27 and the tank 1, so that opportunity for reaction of the free chlorin with the ferrous chlorid or equivalent agent is presented before the solution reaches said tank.

My process may be carried out in this apparatus as follows: The ore, which is assumed to be copper ore, for example, an ore containing native copper, with considerable base metal compound, such as calcite, in the gangue, is reduced to a suitable condition of fineness or division, and is supplied to the tank 1. The leaching solution in tank 5 is preferably an aqueous solution of chlorid of iron, together with sodium chlorid. In starting the process the iron chlorid may be in the form of ferric chlorid, the solution containing say .2 per cent. of ferric chlorid and 5 to 10 per cent. of sodium chlorid. This solution is passed through pipe 4 to tank 1 so as to cover the ore, and the ore is agitated therewith until the copper in the ore has been dissolved. The reaction in this leaching operation may be represented as follows:

$$Cu + FeCl_3 = CuCl + FeCl_2$$

This reaction involves the reduction of ferric chlorid to ferrous chlorid, and causes the copper to be dissolved, at least in part, as cuprous chlorid, which is retained in solution by the sodium chlorid present. More or less cupric chlorid may also be formed in the leaching operation. The solution containing the chlorids of copper and iron is withdrawn from tank 1 into tank 8, and thence is passed through the precipitating tank 10, wherein it is subjected to the action of metallic iron, which causes deposition of copper, an equivalent amount of iron being taken into solution as ferrous chlorid. The spent leach is passed into tank or sump 12, whence it is pumped back to the storage tank 5. From this tank 5, the solution is passed again to the agitator or leaching tank 1, and is regenerated by the action of free chlorin supplied to the solution, preferably while it is passing to the leaching tank. For this purpose, free chlorin generated in the anode compartment 17 of the electrolytic cell 16, is conducted by pipe 26 to the ejector or aspirator 27, which serves to draw the chlorin from the electrolytic cell and also to mix the chlorin with the solution as it passes through the aspirator. The primary action of the free chlorin on the solution is to convert the ferrous chlorid therein into ferric chlorid. Another function of the free chlorin is however, to react with any ferric oxid or hydrate present in the liquid, to restore the iron to the solution in soluble form. Such ferric oxid or hydrate may, for example, be formed by the reaction of atmospheric oxygen with the ferric salt at various stages of the process, or it may result from the action of base metal compounds in the ore on the ferric chlorid. In either case, the free chlorin reacts with the ferric hydrate, for example, to form ferric chlorid and hypochlorous acid, as represented in the following equation:

$$Fe(OH)_3 + 6Cl = FeCl_3 + 3HClO$$

This not only restores to the solution the iron which would otherwise be lost therefrom by the action of the air and of the base metal compounds in the ore, but also produces in the leach an active leaching agent, which is capable of dissolving the copper in the ore. I prefer to carry out the process so that the solution, in passing through the pipe 4, from the aspirator 27 to the leaching tank 1, is maintained for a sufficient time in contact with the chlorin to convert substantially all of the ferrous chlorid to ferric chlorid, and we also prefer to supply an excess of chlorin to the solution at the aspirator 27, this excess of chlorin serving to react with any ferric hydrate suspended in the solution, as the result, for example, of the action of air in the preceding operations, and a portion of this free chlorin passing into the leaching tank 1, where it reacts with any ferric hydrate or carbonate produced by the action of base metal compounds on the ore.

My process may also be used in the extraction of copper from sulfid ores, and in that case the production of hypochlorous acid by reaction of the free chlorin with any ferric hydrate present (as a result, for example, of the action of base metal compound in the ore on ferric chlorid of the leach) is of especial advantage on account of the especial activity of hypochlorous acid in dissolving copper from sulfid ores. It may in some cases even be desirable to add some metallic hydroxid to the solution before or during the regeneration so as to produce hypochlorous acid in excess of the amount normally produced through the reactions above described, this being particularly desirable when operating upon ores containing relatively little calcite or similar base metal compounds and where the copper is present largely in the form of sulfids.

The solution in the anode compartment of the electrolytic cell may be a nearly saturated sodium chlorid solution, and a similar solution may be placed in the cathode compartment, this strength of solution giving the low resistance required for economical electrolysis, and being considerably greater than is desirable for the leaching solution. In the electrolysis, free chlorin is produced in the anode compartment, and is drawn off, as above stated, and sodium hydrate is produced in the cathode compartment, and may be drawn off through the outlet 25.

The sodium hydrate produced in the process as above described is a valuable by-product and may be recovered from the solution flowing from the cathode compartment in any suitable manner. This solution will, in general, contain considerable sodium chlorid, which may be separated by evaporation and crystallization, and the sodium chlorid then returned to the electrolytic cell, by any suitable means. The remaining sodium hydrate solution may then be evaporated to produce caustic soda in commercial form. The value of the caustic soda produced, will in general be sufficient to nearly or quite cover the cost of the electrolytic operation and the cost of the sodium chlorid, so that the chlorin is furnished at little, if any cost.

It will be understood that at each cyclic operation, more or less sodium chlorid is lost to the cycle by passing off with the sludge from the agitator—and the solution must, therefore, be replenished with sodium chlorid from time to time or continuously. For this purpose I may use a part of the sodium chlorid supplied to the electrolytic cell, a portion of the sodium chlorid solution being passed, for example, from the anode compartment of said cell to the agitator 1 through a pipe 23'. By this operation I am enabled to utilize the chlorin present in this anode solution, which might otherwise be wasted in the effluent from the anode compartment of the cell.

What I claim is:

1. The process of extracting a metal from its ores which consists in electrolyzing a relatively strong solution of sodium chlorid to produce free chlorin and sodium hydrate, separating such sodium hydrate as a by-product, leaching said ore with a relatively weak solution of sodium chlorid containing a metallic chlorid capable of dissolving said metal in the ore, separating the resulting solution from the ore, precipitating the said metal therefrom, and then regenerating said solution by the action of free chlorin produced by electrolysis as above stated.

2. The process of extracting a metal from its ores which consists in leaching the ore with a relatively weak solution of alkali metal chlorid containing a metallic chlorid capable of reduction to a lower chlorid, separating said solution from the ore, precipitating the metal to be extracted from the solution, and then regenerating the solution by the action of free chlorin generated by electrolysis of a relatively strong solution of alkali metal chlorid.

3. The process of extracting a metal from its ores which consists in subjecting the ore to the action of a relatively weak solution of sodium chlorid, together with ferric chlorid, and subjecting a relatively strong solution of sodium chlorid to electrolysis to produce free chlorin, removing the first named solution from the ore, precipitating the said metal therefrom, and conducting the chlorin resulting from said electrolysis into the solution for regenerating the same for cyclic repetition of the process.

4. The process of collecting copper from its ores which consists in electrolyzing a relatively strong solution of sodium chlorid to produce free chlorin and sodium hydrate, separating such sodium hydrate as a by-product, leaching said ore with a relatively weak solution of sodium chlorid containing ferric chlorid, separating the resulting solution from the ore, precipitating the copper by the action of metallic iron and then regenerating said solution by the action of free chlorin produced by electrolysis as above stated.

5. The process of extracting a metal from an ore thereof containing a base metal compound which consists in electrolyzing a relatively strong solution of sodium chlorid to produce free chlorin and sodium hydrate, separating the sodium hydrate as a by-product, leaching the ore with a relatively weak solution of sodium chlorid containing ferric chlorid, separating the resultant solution from the ore, precipitating the extracted metal by the action of metallic iron and regenerating the solution by action of free chlorid produced by electrolysis in the manner stated, the chlorin being supplied in excess so as to react with ferric hydroxid produced by the action of the base metal compound during the leaching operation to restore the iron of such ferric hydroxid to the solution in the form of ferric chlorid and to form an active leaching compound containing chlorin and oxygen.

In testimony whereof I have hereunto set my hand, at Washington, D. C., this 15th day of February 1916.

WALTER AUGUST SCHMIDT.

Copies of this patent may be obtained for five cents each, by addressing the "Commissioner of Patents, Washington, D. C."